A. T. BOLSER.
SIGNAL DEVICE FOR AUTOMOBILES.
APPLICATION FILED JUNE 22, 1917.
1,273,816.
Patented July 30, 1918.
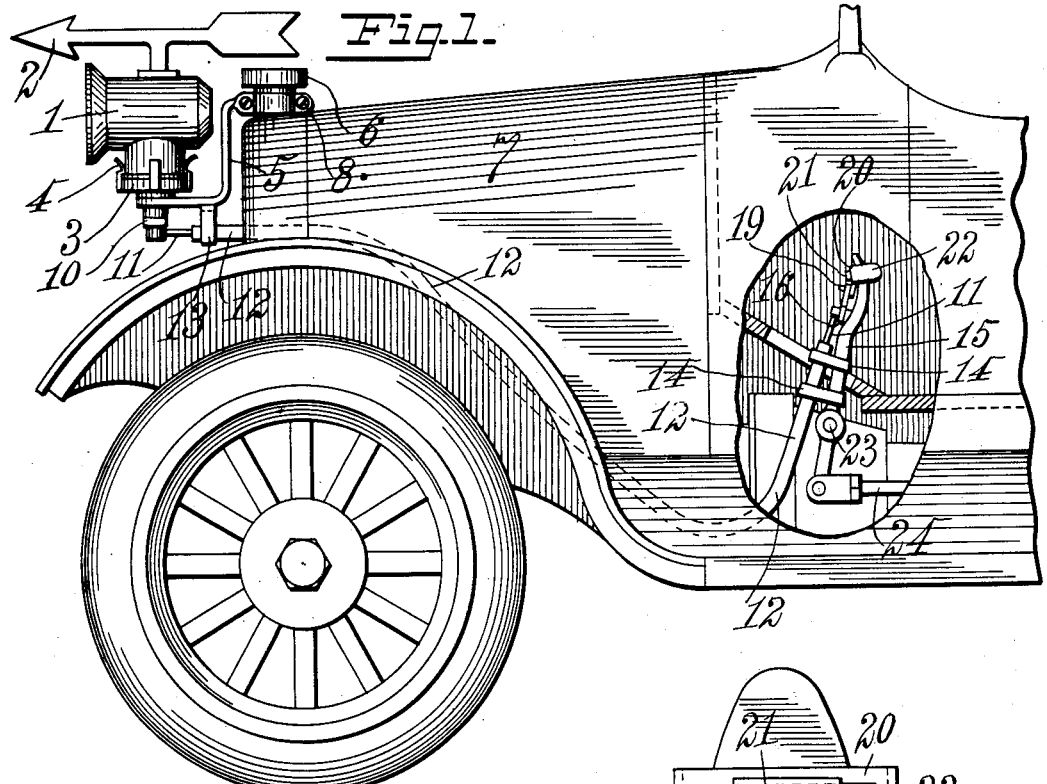
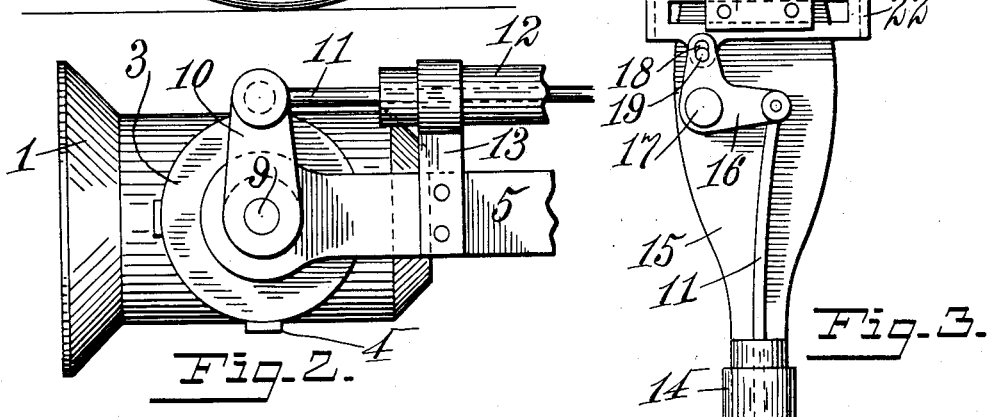
WITNESS
INVENTOR
Archibald T. Bolser
BY
ATTORNEY

UNITED STATES PATENT OFFICE.

ARCHIBALD T. BOLSER, OF DAYTON, OHIO.

SIGNAL DEVICE FOR AUTOMOBILES.

1,273,816.  Specification of Letters Patent.  Patented July 30, 1918.

Application filed June 22, 1917. Serial No. 176,281.

*To all whom it may concern:*

Be it known that I, ARCHIBALD T. BOLSER, citizen of the United States, residing at Dayton, in the county of Montgomery and State of Ohio, have invented certain new and useful Improvements in Signal Devices for Automobiles; and do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for controlling the signal lamps of automobiles. The object of the invention is to provide a lamp-control connection which is operated to change the position of the lamp to indicate the direction in which the vehicle will travel when reaching turns or intersections of streets or roadways. A further object of the invention is to provide a lamp which is easily disconnected from its support when it is desired to use the same for a search-light about the automobile in locating trouble, etc.

Before entering into a particular description of the device, reference is made to the accompanying drawings, of which Figure 1 is a side elevation of the front portion of an automobile having my improved lamp-control connection arranged therein, a portion of the body of the automobile being broken out to disclose the operating treadle connection. Fig. 2 is a bottom plan view of the lamp detached from its support showing the connection of the operating means therewith. Fig. 3 is a bottom plan view of the treadle upon which is supported the shifting device through which the lamp is turned to indicate the direction of movement of the automobile. Fig. 4 is a detailed elevation of the shifting device through which the lamp is turned through a movement of the intervening connection.

In a particular description of the invention, similar reference characters indicate corresponding parts. The lamp 1 may be provided with a dart or arrow 2 which is rigidly attached to the upper side of the lamp. This arrow serves as a means for indicating to pedestrians in day time the direction in which the car intends to move. The said arrow is necessarily of a proper size to be seen at a reasonable distance. The lamp 1 is mounted upon a base or turn-table 3 and is held thereon by spring clamps 4 which project from the base or turn-table 3 and snap over the lower portion of the lamp. The lamp is therefore detachable from the supporting base 3 whenever it is desired to use it for the purpose of locating trouble about the machine. The base or turn-table 3 upon which the lamp is supported is in turn supported upon a bracket 5 which is clamped around the water inlet pipe 6 at the forward end of the hood 7 of the automobile. The bracket is made rigid in this position by screws 8 which enter the clamped portion of said bracket. The base or turn-table 3 has a stem 9 projecting downwardly through the lower end of the bracket 5 which pin forms a pivot upon which the lamp is turned. The lower end of the pivot pin 9 is rigidly connected to a crank arm 10, the outer end of which is connected with a suitable operating rod 11, said operating rod being of a flexible character such, for example, as wire rope. The operating rod 11 passes through a flexible tube 12 which extends through the hood 7 to within access of the driver of the automobile. The flexible tube 12 is connected at one end to the lamp bracket 5 by a lateral bracket 13 and at the other end the said flexible tube 12 is connected by means of a bracket 14 to a suitable foot operated pedal. This pedal is indicated by 15 and it may be either the pedal through which the clutch of the automobile (not shown) is operated or it may be the pedal through which the emergency brake is applied. The purpose of applying the lamp-operating device to a foot treadle is to avoid any necessity for the operator to operate the lamp control by hand. Being attached to a pedal, the device is within easy reach of the foot of the operator while his hands may be free to steer the machine. The operating rod 11, therefore, extends through the tube 12 below the under side of the foot treadle 15 where it is connected with an angular lever 16 which is pivoted at 17 to said foot treadle. The other arm of the lever 16 has an elongated slot 18 in it which receives a pin 19 that projects from a laterally slidable plate 20. The plate 20 lies across the under side of the foot treadle and is maintained in a slidable position by a guide plate 21, the sides of which extend over the opposite sides of the plate 20 and said plate 20 is thus maintained in a position to be moved crosswise of the foot treadle by the foot of the operator. The ends of the plate 20 are turned up as at 22 to provide portions which are engaged by the foot of the operator in shifting the plate 20 from one side to the other according to the direction in which the lamp is to be turned. It will be understood that the guide plate 21 is secured to the under side of the treadle 15 and that there is such freedom of movement allowed to the plate 20 that the foot may readily shift said plate to one side or the other by the foot engaging the up-turned ends 22 of said plate 20. It will be readily seen that when the plate 20 is shifted to one side or the other, the rod 11 will be operated through the angular lever 16 to turn the lamp to one side or the other or to move the lamp in its central position. The foot treadle 15, as before stated, may be that through which the brake or the clutch is operated. As shown in Fig. 1, it is pivoted at 23 and the said foot treadle has connected to its lower end a rod 24 which may serve either of the purposes mentioned above in connection with the foot treadle.

Having described my invention, I claim:

1. The combination with a motor vehicle having a foot treadle and a signal device, of a turn-table upon which said signal device is mounted, a flexible connection extending from said turn-table, a slidable foot plate mounted on said foot treadle, and a pivotal member connected with said slidable foot plate and said flexible connection, substantially as specified.

2. The combination with a motor vehicle having a foot treadle and a signal device, of a turn-table supporting said signal device, a flexible connection extending from said turn-table, a shiftable foot plate mounted on said foot treadle, and a bell crank lever having a pivotal connection with said slidable plate and a connection with the flexible connection of the turn-table.

In testimony whereof I affix my signature.

ARCHIBALD T. BOLSER.